United States Patent
Cho et al.

(10) Patent No.: US 7,507,000 B2
(45) Date of Patent: Mar. 24, 2009

(54) ILLUMINATION SENSING DEVICE FOR PORTABLE TERMINAL

(75) Inventors: Bum-Lai Cho, Suwon-si (KR); Moon-Young Cha, Anyang-si (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 11/743,328

(22) Filed: May 2, 2007

(65) Prior Publication Data
US 2007/0274101 A1    Nov. 29, 2007

(30) Foreign Application Priority Data
May 25, 2006   (KR) .................. 10-2006-0047058

(51) Int. Cl.
*F21V 23/04* (2006.01)
(52) U.S. Cl. .................. 362/276; 362/29; 362/632
(58) Field of Classification Search .............. 362/1, 362/4, 29, 30, 85, 276, 362, 632, 633, 634; 345/102
See application file for complete search history.

(56) References Cited

U.S. PATENT DOCUMENTS

| | | | | |
|---|---|---|---|---|
| 3,001,443 | A | * | 9/1961 | Stimson et al. ............. 356/222 |
| 2006/0151678 | A1 | * | 7/2006 | Shibata ...................... 345/102 |
| 2007/0200817 | A1 | * | 8/2007 | Tsai et al. ................... 345/102 |
| 2007/0216796 | A1 | * | 9/2007 | Lenel et al. ................... 362/85 |

* cited by examiner

*Primary Examiner*—Y My Quach Lee
(74) *Attorney, Agent, or Firm*—H.C. Park & Associates, PLC

(57) ABSTRACT

An illumination sensing device for a portable terminal is disclosed. The illumination sensing device includes a housing having a sensor hole extending through a side of the housing, a printed circuit board in the housing and connected to a backlight unit, an illumination sensor coupled with the printed circuit board and disposed in the sensor hole, and an optical guide disposed in the sensor hole and facing the illumination sensor. The illumination sensor senses light introduced through the optical guide from outside the housing, and the backlight unit is operated based on the light sensed by the illumination sensor.

6 Claims, 2 Drawing Sheets

ILLUMINATION SENSING DEVICE FOR PORTABLE TERMINAL

CROSS REFERENCE TO RELATED APPLICATION

This application claims priority from and the benefit of Korean Patent Application No. 2006-47058, filed on May 25, 2006, which is hereby incorporated by reference for all purposes as if fully set forth herein.

BACKGROUND OF THE INVENTION

1. Field of the Invention

The present invention relates to an illumination sensing device, and more particularly to an illumination sensing device that senses external light in a portable terminal.

2. Discussion of the Background

Generally, a portable terminal refers to a device utilized for wireless communication. Portable terminals may be used to provide various contents, such as television programs, on-line games, on-demand videos, etc. as well as voice communication service and short message service (i.e. text messages).

A portable terminal may be a bar-type terminal, flip-type terminal, or folder-type terminal according to its external structure. The bar-type terminal has a single housing with a communication circuit, a transmitter unit, a receiver unit, input/output units, etc. The flip-type terminal includes a flip cover in addition to the structure of the bar-type terminal. The folder-type terminal includes a pair of housings, and various elements including input/output units are included in the housings. A sliding-type portable terminal has recently emerged, so as to enhance, together with the folder-type terminal, the portability and convenience of the terminal and to satisfy various user requirements.

Portable terminals usually utilize a liquid crystal display (LCD) for their display unit. A user may easily recognize information displayed on the LCD when the LCD is in a bright environment. However, it may be difficult for a user to recognize information displayed on the LCD when the LCD is in a dark environment. Therefore, a light emitting diode (LED) may be used to provide additional illumination for the LCD. Such an LED is called a backlight unit, which usually provides illumination during a predetermined time interval when one surface of the terminal's housing is open to expose a keypad or one of the keys of the keypad is pressed.

However, the conventional backlight unit may provide illumination regardless of the environment in which the portable terminal is used. Therefore, the conventional backlight unit may consume a large amount of battery power, thereby reducing the terminal's stand-by and operating time.

In order to overcome such a problem, a portable terminal may be equipped with an illumination sensor that is mounted in the terminal's housing to receive and sense external light. Using the illumination sensor, it may be possible to achieve automatic backlighting control that is appropriate to the environment in which the portable terminal is used.

However, because the illumination sensor is mounted in the terminal's housing, the quantity of received light may change due to the distance between the housing and the illumination sensor's light-sensing surface, thereby disturbing exact operation of the illumination sensor.

SUMMARY OF THE INVENTION

The present invention provides an illumination sensing device for a portable terminal that may control a backlight unit of the portable terminal according to the environment in which the portable terminal is used.

The present invention also provides an illumination sensing device for a portable terminal in which external light may be guided to an illumination sensor.

The present invention also provides an illumination sensing device for a portable terminal that may reduce the portable terminal's power consumption.

Additional features of the invention will be set forth in the description which follows, and in part will be apparent from the description, or may be learned by practice of the invention.

The present invention discloses an illumination sensing device for a portable terminal. The illumination sensing device includes a housing having a sensor hole extending through one side of the housing. A printed circuit board is arranged in the housing and connected to a backlight unit. An illumination sensor is coupled with a surface of the printed circuit board and disposed in the sensor hole, and an optical guide is disposed in the sensor hole and to face the illumination sensor. The illumination sensor senses light introduced through the optical guide from outside the housing, and the backlight unit is operated based on the light sensed by the illumination sensor.

The present invention also discloses an illumination sensing device for a portable terminal, including a housing comprising a hole, an optical guide arranged in the hole, an illumination sensor, and a printed circuit board. The optical guide provides a light to the illumination sensor, the illumination sensor generates a signal based on the light, and the printed circuit board operates a backlight unit according to the signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
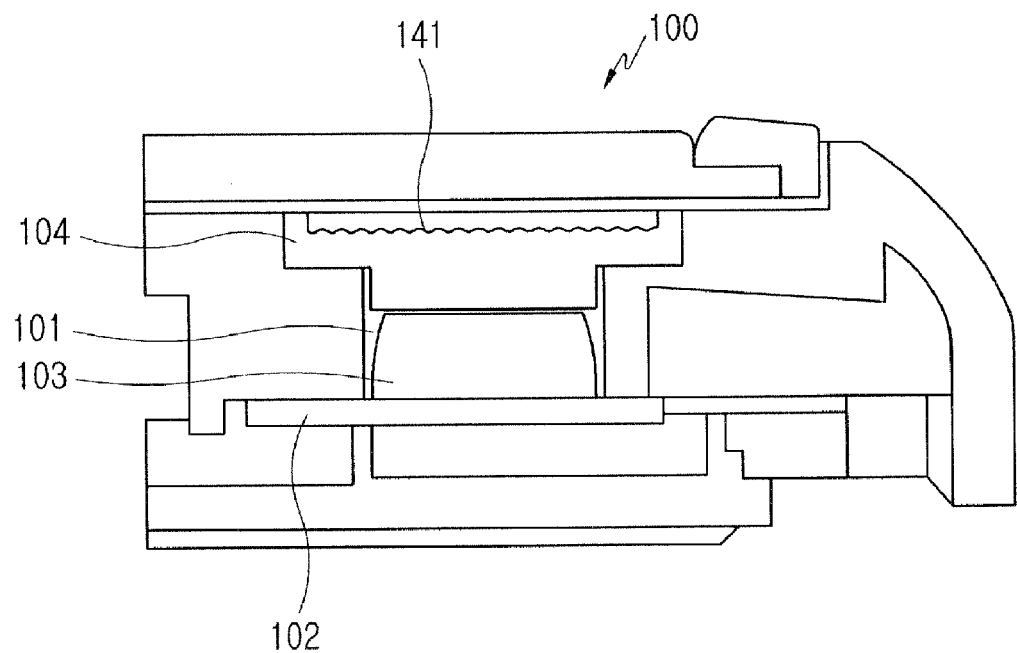
FIG. 1 is a sectional view of an illumination sensing device for a portable terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. In the following description, a detailed description of known functions and configurations incorporated herein will be omitted when it may make the subject matter of the present invention rather unclear.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present.

Figure 2:
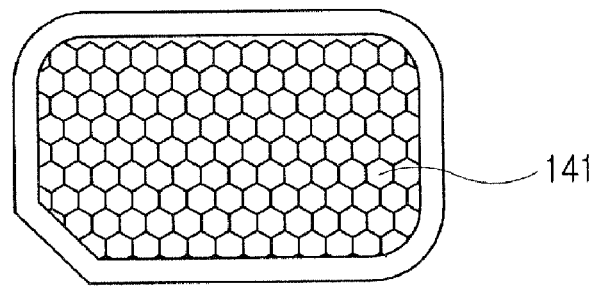
FIG. 2 is a front view of an optical guide in the illumination sensing device of FIG. 1.
Figure 3:
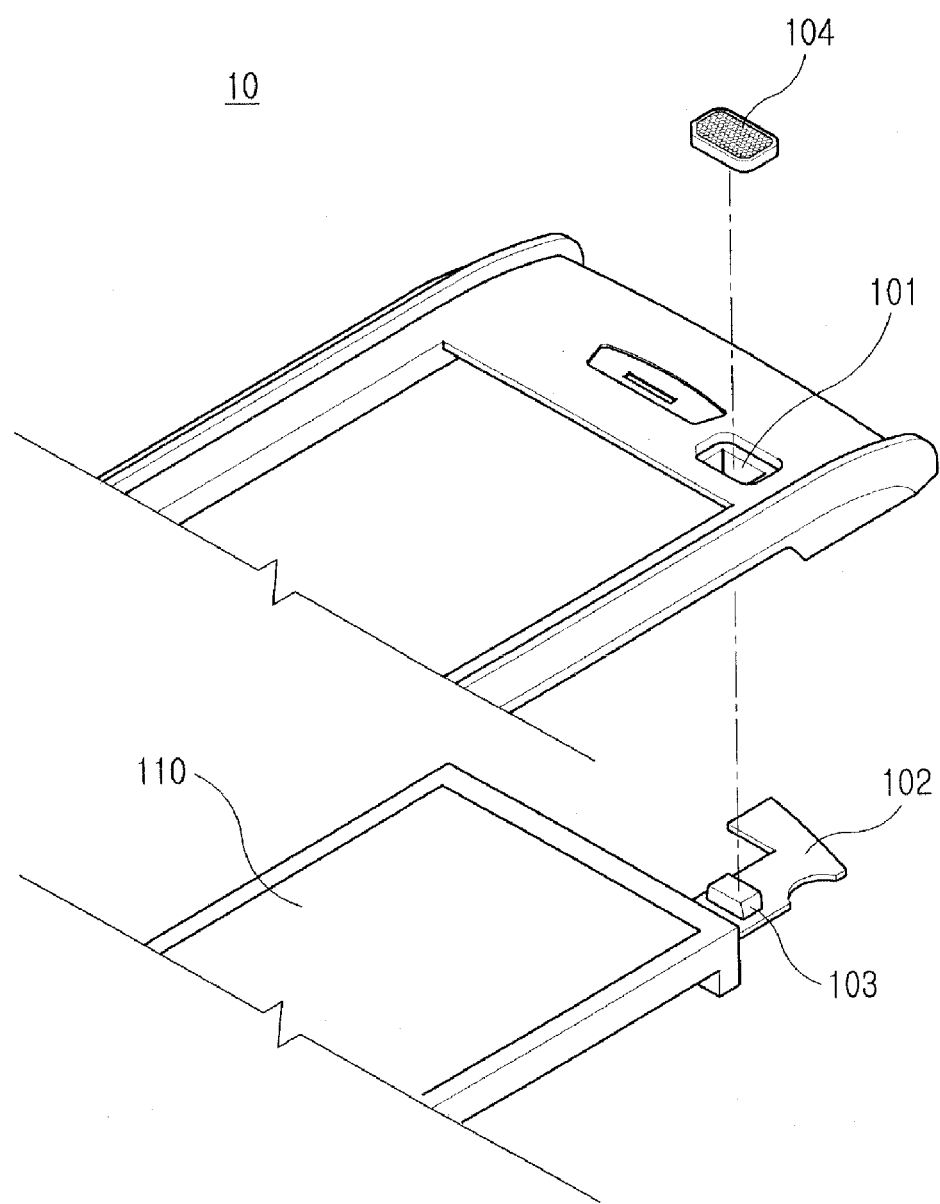
FIG. 3 is an exploded perspective view of a housing and a display unit in the illumination sensing device of FIG. 1.

Referring to FIG. 1, FIG. 2, and FIG. 3, an illumination sensing device 100 includes a sensor hole 101, a printed circuit board (PCB) 102, an illumination sensor 103, and an optical guide 104. The illumination sensing device 100 is disposed at a position that may be easily exposed to external light. In FIG. 3, the illumination sensing device 100 is disposed adjacent to a display unit 110.

The sensor hole 101 extends through one side of a housing 10, so as to interconnect the inside and the outside of the housing 10. Therefore, light from outside the housing 10 may pass through the sensor hole 101 to reach the inside of the housing 10.

The PCB 102 is mounted inside the housing 10 and connected to a backlight unit (not shown).

The illumination sensor 103 is mounted on the PCB 102 and seated in the sensor hole 101. When the illumination sensor 103 senses light from outside the housing 10, it generates and sends a signal to the PCB 102. Here, the quantity of the sensed light may determine the type or magnitude of the signal the illumination sensor 103 generates.

The optical guide 104 includes a light-collecting lens, which guides light passing through the sensor hole 101 from outside the housing 10 to the illumination sensor 103. The optical guide 104 has a honeycomb surface 141, which may make it impossible to see into the housing 10 from outside the housing 10. Further, the honeycomb surface 141 facilitates collection of light from the terminal's surroundings. A portion of the optical guide 104 protrudes into the sensor hole 101 and is closely arranged to face the illumination sensor 103. Because the surface of the protruding portion of the optical guide 104 is arranged close to the surface of the illumination sensor 103, the optical guide 104 may efficiently guide light to the illumination sensor 103.

The backlight unit (not shown), which is connected to the PCB 102, is located adjacent to the display unit 110 and a keypad unit (not shown). The backlight unit receives the signal generated by the illumination sensor 103 through the PCB 102. The display unit 110 may include various types of elements, such as a liquid crystal display (LCD) or a thin film transistor (TFT), and it displays various information including information relating to the status of the terminal, data transmission/reception, an image of a subject, etc. The keypad unit includes a plurality of keys, which are used to input telephone numbers, text for short messages, etc. The keypad unit may be exposed by moving the housing 10 so that a user can touch the keypad. The backlight unit is driven by the signal transferred through the illumination sensing device 100, so as to help a user see information displayed by the display unit 110 or operate the keypad unit.

Operation of the illumination sensing device 100 will be described below.

Light from outside the housing 10 is guided through the optical guide 104 to the illumination sensor 103. When it is detected that the terminal is being operated, especially when the keypad unit is touched, the illumination sensor 103 generates a signal. The generated signal is based on the quantity of sensed light, and it is transferred to the PCB 102. When it is difficult to see the display unit 110 or use the keypad unit using only light from outside the housing 10, the PCB 102 transmits the signal generated by the illumination sensor 103, so as to drive the backlight unit. In other words, the backlight unit is turned on. On the other hand, when there is sufficient light for the user to see the display unit 110 or use the keypad unit, the signal generated by the illumination sensor 103 will not cause the backlight unit to operate. In other words, the backlight unit will not turn on.

As described above, the signal generated by the illumination sensor 103 is transmitted through the PCB 102 and is used to drive the backlight unit.

A user can optionally set conditions for the operation of the backlight unit. More specifically, a user can configure an environment for the operation of the backlight unit of the terminal through an environment setup in such a way that the signal generated by the illumination sensor 103 may have different magnitudes according to the setup environment even when the quantity of sensed light is constant. Therefore, the user can optionally select a reference condition for the operation of the backlight unit according to the user's own taste. Further, the user can control the length of time that the backlight unit operates through the environment setup for the terminal. In this case, when a preset amount of time has passed after the backlight unit is turned on due to the user's operation of the terminal, etc., the backlight unit is automatically turned off. However, if user's operation of the terminal, including the keypad unit, is detected again, the backlight unit is turned on again based on the environment setup. After moving the terminal from an environment that requires operation of the backlight unit to an environment that does not require backlight unit operation, the backlight unit is not turned on even though the user touches or operates the keypad unit.

In the illumination sensing device 100 according to an exemplary embodiment of the present invention as described above, it may be possible to adjust the brightness of the backlight unit according to the quantity or intensity of light sensed by the illumination sensor 103. The illumination sensor 103 generates a signal, which has different magnitudes according to the quantity of external light it senses, and transmits the signal to the PCB 102. The PCB 102 provides the signal from the illumination sensor 103 to the backlight unit, which emits light with a brightness corresponding to the signal provided by the PCB 102.

As described above, an illumination sensing device for a portable terminal according to an exemplary embodiment of the present invention includes a sensor hole formed through a housing, an illumination sensor, and a printed circuit board. Light from outside the housing is introduced through the sensor hole and sensed by the illumination sensor. The illumination sensor generates a signal based on the sensed light, and the printed circuit board controls a backlight unit of the illumination sensing device based on the signal generated by the illumination sensor. Therefore, the illumination sensing device can control the backlight unit according to the environment in which the terminal is used. Further, the illumination sensing device according to an exemplary embodiment of the present invention includes an optical guide disposed in the sensor hole. The optical guide directs light from the outside to the illumination sensor, thereby enhancing the illumination sensor's efficiency. Therefore, exemplary embodiments of the present invention can prevent the backlight unit from emitting light beyond the degree necessary to see and use the portable terminal, thereby reducing the portable terminal's power consumption.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An illumination sensing device for a portable terminal, comprising:
   a housing comprising a sensor hole extending through a side of the housing;
   a printed circuit board arranged in the housing and connected to a backlight unit;
   an illumination sensor coupled with a surface of the printed circuit board and disposed in the sensor hole; and
   an optical guide disposed in the sensor hole and facing the illumination sensor,
   wherein the illumination sensor senses light introduced through the optical guide from outside the housing, the backlight unit being operated based on the light sensed by the illumination sensor, and
   wherein the optical guide comprises a lens, the lens comprising a honeycomb structure.

2. The illumination sensing device of claim 1, wherein a surface of the optical guide faces, but does not contact, the illumination sensor.

3. The illumination sensing device of claim 1, wherein the backlight unit is operated based on a quantity of the light sensed by the illumination sensor.

4. The illumination sensing device of claim 3, wherein a brightness of the backlight unit decreases as the quantity of the light sensed by the illumination sensor increases.

5. The illumination sensing device of claim 1, wherein a brightness of the backlight unit is controlled based on a quantity of the light sensed by the illumination sensor.

6. A portable terminal comprising the illumination sensing device of claim 1.

* * * * *